United States Patent
Baumann

[11] 3,723,995
[45] Apr. 3, 1973

[54] PROSTHETIC HIP ENARTHROSIS

[75] Inventor: Friedrich Baumann, Neuburg an Der Danube, Germany

[73] Assignee: Osteo AG, Solothurn, Switzerland

[22] Filed: May 19, 1970

[21] Appl. No.: 38,680

[30] Foreign Application Priority Data

May 23, 1969 Switzerland...........................7909/69

[52] U.S. Cl..................3/1, 128/92 C, 128/92 CA, 287/87, 287/90 R
[51] Int. Cl................................................A61f 1/24
[58] Field of Search........3/1; 128/92 R, 92 C, 92 CA; 287/87, 90 R, 90 C

[56] References Cited

UNITED STATES PATENTS

| 1,976,983 | 10/1934 | Chandler | 287/90 R |
| 2,887,334 | 5/1959 | Adams | 287/90 R |
| 2,971,770 | 2/1961 | Wagner | 287/90 R X |
| 3,155,406 | 11/1964 | Gottschald | 287/87 |
| 2,809,855 | 10/1957 | Booth | 287/90 C |
| 3,067,740 | 12/1962 | Haboush | 128/92 CA |
| 3,466,670 | 9/1969 | Christiansen | 3/1 |

FOREIGN PATENTS OR APPLICATIONS

| 80,881 | 5/1963 | France | 287/87 |
| 1,047,640 | 7/1953 | France | 128/92 C |
| 1,448,955 | 7/1966 | France | 128/92 CA |

Primary Examiner—Richard A. Gaudet
Assistant Examiner—Ronald L. Frinks
Attorney—Karl F. Ross, Esq.

[57] ABSTRACT

A prosthetic hip enarthrosis has a plurality of freely moving bearing balls occupying substantially the entire space between a ball provided for attachment to the femur and the concavity of a socket that is adapted to be attached to the pelvis to serve as a prosthetic acetabulum. A long-lasting lubricant is sealed in that space around the bearing balls by an agent, compatible with body tissue, which is carried by a locking ring that secures the ball in the socket in an adjustable manner so as to control the degree of mobility of the ball-and-socket joint.

4 Claims, 1 Drawing Figure

PATENTED APR 3 1973  3,723,995
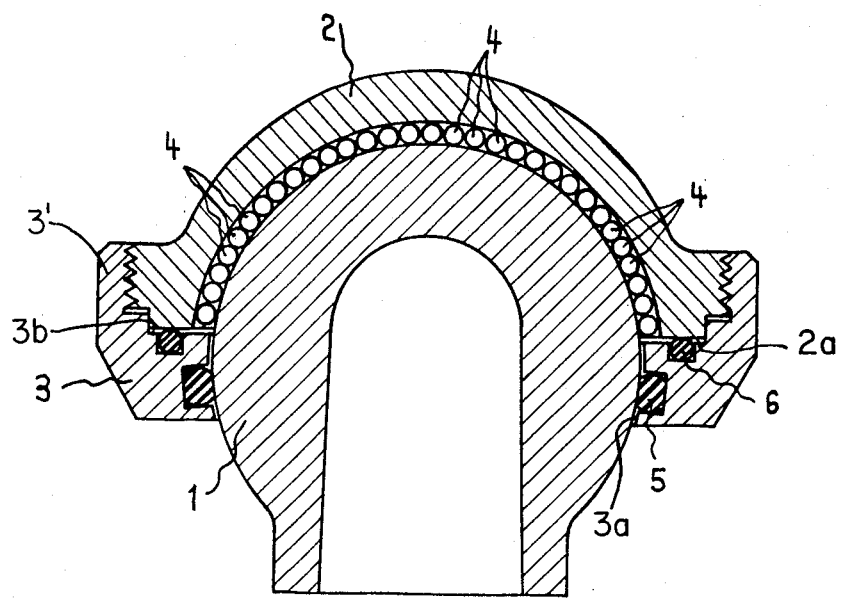
INVENTOR.
FRIEDRICH BAUMANN

PROSTHETIC HIP ENARTHROSIS

This invention relates to a prosthetic enarthrosis for the hip. Prosthetic ball-and-socket joints for hips have been known since 1948. In the beginning, the joint ball only was replaced, but later both joint portions, namely the joint ball and the joint socket or pan were replaced. Replacement of one joint portion may be effected in a satisfactory manner with the prosthesis and auxiliary material available up to now. However, when both joint portions had to be replaced, new problems arose and could not be solved in a satisfactory manner in the past.

Owing to the appreciable forces acting in the loaded hip joint, the joint surfaces of the prosthesis are deformed and are subject to wear and corrosion due to the sliding friction. In this way, bad joint and friction conditions produce and cause pains and a decrease in mobility. The products of corrosion or abrasion may leak from the joint into the surrounding body tissue and thereby produce corresponding reactions. The performance of the prosthesis may be somewhat improved by using different materials for the pan or socket and the ball of the joint. Pans of plastic material and balls of metal were used. In order to further reduce friction, a metal pan having a three-point support of plastic material has been used. However, the three plastic bearings do not withstand the high specific loads in the long run, the result being again friction of metal or metal after a relatively short time.

My invention aims at overcoming the above disadvantages of prior prosthesis by providing rolling bodies between the joint ball and the joint pan or socket.

One embodiment of this invention will now be described by way of example with reference to the accompanying drawing the sole FIGURE of which shows an axial section of a hip-joint or enarthrosis according to the present improvement.

The joint ball 1, which may be plug-fastened on a pin anchored in the thigh bone or femur and which has an axial bore to receive such pin, is seated in a generally hemispherical joint pan 2. The pan or socket concentrically but spacedly envelops about half of the ball 1 and defines therewith a closed space, the joint ball being secured on the hollow side thereof (i.e., in the concavity of the socket) by an annular cover or locking ring 3. The curved clearance between the concave fall of the joint pan and the outer surface of the joint ball is filled with a multiplicity of substantially contiguous bearing balls 4. The annular cover or locking ring 3 has an internally threaded flange 3' engaging the joint pan or socket 2, O-rings 5 and 6 are accommodated in annular grooves on a transverse face 3a and an inner peripheral face 3b of the ring 3 for sealingly engaging the ball and the pan, respectively, to close the space therebetween wherein the balls 4 are freely disposed. The joint is lubricated for its lifetime for instance with grease or "-Teflon"-powder disposed in the space that is occupied by the balls 4. O-rings 5 and 6 are made of a yieldable material, such as silicone rubber or the like, that is compatible with the human body tissue and resistant to aging and to chemicals. The cross-section of the O-rings need not necessarily be circular but may be of any other suitable shape. The joint pan may have a wall of variable thickness in order to favorably influence the distribution of load in the bearing. In a preferred embodiment the wall thickness continuously decreases from the apex towards the rim of the joint pan 2.

The joint ball and joint pan may be made of a corrosion-proof CR—Co—Mo alloy compatible with the tissue of the body. Preferably the balls 4 serving as antifrictious bearing means are made of a harder material than the joint ball 1 and the pan 2.

It is a particular advantage that the prosthesis according to my invention is divided into two parts enabling the complete joint to be mounted in the pelvis, the pin to which the joint ball 1 is plugged being fixed in the thigh bone or femur and with the socket serving as a prosthetic acetabulum and being attached at its convex face to the side of the pelvis. The mobility of the joint is adjustable by tightening or loosening the annular cover or locking ring 3 by means of its screw thread, thereby deforming the O-ring 6 which projects into the gap between the face 3a of ring 3 and a confronting transverse face 2a of socket 2. Abrasion and wear of the joint is much smaller and slower than in conventional joints so that renewal of the joint becomes unnecessary or is required only at much longer time intervals than with prior joints.

I claim:

1. A prosthetic hip enarthrosis comprising:
   a ball having means for attaching same to the femur of a wearer;
   a generally hemispherical socket concentrically and spacedly surrounding about half of said ball, thereby defining a curved clearance therewith;
   a locking ring spacedly surrounding another part of said ball, said locking ring and said socket being provided with two parallel transverse faces separated by a gap, one of said faces having a groove confronting the other face, said locking ring having a flange surrounding said socket in threaded engagement therewith;
   a first deformable O-ring seated in said groove and bearing upon said other face;
   a second deformable O-ring seated in another groove on the inner periphery of said locking ring and bearing upon said ball, said O-rings sealing said clearance against the outside while enabling limited relative motion of said ball and said socket to vary the depth of said clearance by relative rotation of said locking ring and said socket; and
   multiple discrete rolling-type antifriction bearing means and a lubricant in said clearance maintaining the spacing between said ball and said socket.

2. A prosthetic hip enarthrosis as defined in claim 1 wherein said antifriction bearing means comprises a multiplicity of substantially contiguous spherical bodies.

3. A prosthetic hip enarthrosis as defined in claim 2 wherein said spherical bodies are of greater hardness than said ball and said socket.

4. A prosthetic hip enarthrosis as defined in claim 1 wherein the groove accommodating said first O-ring is provided in the transverse face of said locking ring.

* * * * *